C. S. LOCKWOOD.
ROLLER BEARING WITH CYLINDRICAL AND CONICAL ROLLS.
APPLICATION FILED JUNE 7, 1916.
1,200,510.
Patented Oct. 10, 1916.
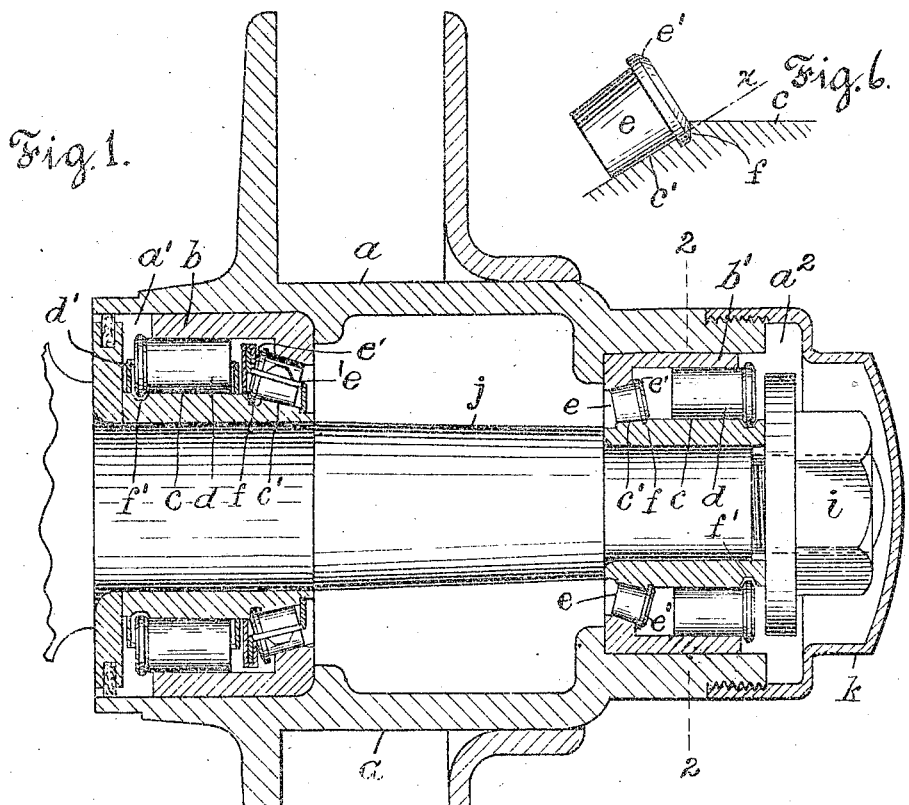
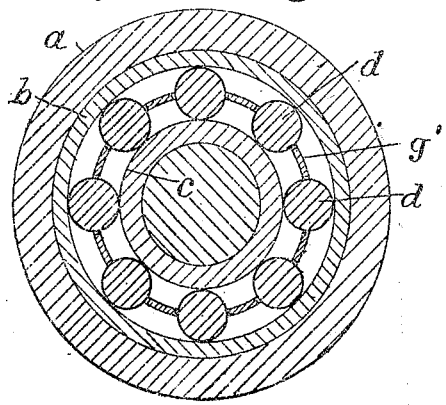
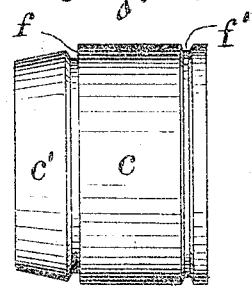
Inventor
Charles S. Lockwood, per
Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

ROLLER-BEARING WITH CYLINDRICAL AND CONICAL ROLLS.

1,200,510.  Specification of Letters Patent.  Patented Oct. 10, 1916.

Application filed June 7, 1916. Serial No. 102,117.

*To all whom it may concern:*

Be it known that I, CHARLES S. LOCKWOOD, a citizen of the United States, residing at 496 Clinton avenue, Newark, county of Essex, and State of New Jersey, have invented certain new and useful Improvements in Roller-Bearings with Cylindrical and Conical Rolls, fully described and represented in the following specification and the accompanying drawings, forming a part of the same.

The object of this invention is to furnish a roller-bearing adapted to resist side and end strain by the employment of two sets of rolls one cylindrical and the other tapering, and the construction especially facilitates the application of the casing over the rolls so that the bearing may be used in wheel-centers which require at times to be removed from the axle-journal. In this construction the hub of the bearing is provided with two adjacent seats, one cylindrical to receive the cylindrical rolls and the other seat tapering to receive the tapering rolls; and the casing is in like manner made with cylindrical and tapering seats opposed to those upon the hub. The tapering rolls have each a beveled flange to bear within a groove at the junction of the roll-seats. The bearing thus constructed is adapted to resist end-thrust in one direction, and when it is desired, as in a wheel-center, to resist thrust in both directions, the journal is provided with two of the bearings fitted reversely to the opposite ends of the wheel-center.

The outer bearing is fitted removably to the journal near its outer end and held thereon by a nut and washer, the reverse arrangement of the two sets of tapering rolls thereon sufficing without any other restraining means to hold the wheel-center in place upon the journal.

The invention will be understood by reference to the annexed drawing, in which—

Figure 1 is a longitudinal section of a wheel-center with the journal and two bearings therein, the bearing in the left-hand end of the journal being shown with a cage, and the case being omitted in the bearing in the right-hand end. Fig. 2 is a cross section on line 2—2 in Fig. 1; Fig. 3 is an elevation of the hub in the left-hand end of the journal; Fig. 4 is an elevation of one of the tapering rolls; Fig. 5 is a similar view of one of the cylindrical rolls; and Fig. 6 a diagram upon an enlarged scale, showing the operation of the thrust-flange upon the tapering roll.

$a$ designates the wheel-center with chambers $a'$ and $a^2$ in its opposite ends to receive the casings $b$ and $b'$ of the two roller-bearings. A journal $j$ is shown within the wheel-center and provided near its opposite ends with hubs having each a cylindrical roll-seat $c$, and an adjacent tapering roll-seat $c'$. The journal is stepped to receive the outer hub which is held removably thereon by a nut $i$, the usual cap $k$ being screwed upon the wheel-center to close the same to exclude dirt. An inner groove $f$ is formed at the junction of the roll-seats and an outer groove $f'$ at the outer end of the cylindrical seat. Cylindrical rolls $d$ are shown inserted between the respective hubs and casings, and each roll has a collar $d'$ fitted loosely to the groove $f$, to guide the rolls in a circular path about the hub; but not in any way supporting end-strain. The casing is provided with cylindrical and tapering seats opposed to those upon the hub, and tapering rolls $e$ are shown fitted between such tapering seats and provided each upon its larger end with a beveled flange $e'$, the outer beveled side of which bears against a flat side of the groove $f$. The tapering roll-seat $c'$ is made at its larger end of less diameter than the cylindrical seat $c$, and the flange $e'$ is proportioned to bear upon the flat side of the groove $f$ partly within and partly outside the line of the roll-seat $c'$, as shown in Fig. 6, where the parts are enlarged and a dotted line $x$ indicates the prolongation of the roll-seat through the flat side of the groove $f$. By this construction a part of the bevel upon the flange $e'$ revolves at a greater speed and a part at a lesser speed than the surface of the tapering roll, and such proportions of the flange are made to balance the opposed velocities and obviate any drag or accelerating tendency upon the end of the tapering roll which would tend to move it out of its normal position in its cage.

Space is provided in the chambers $a'$, $a^2$ at both ends of the cylindrical rolls $b$ to insert the heads of a suitable cage for keeping the said rolls properly spaced; and space is provided at both ends of the tapering rolls $e$ for the circular heads of a cage to space such rolls properly. Fig. 2 shows the bars $g'$ of the cage $g$ between the rolls $d$. As the use of such cages is already well known, as in my Patent No. 1183658 issued May 16, 1916, the cage is omitted from the other bearing to avoid obscuring the drawing. The casing $b$ is constructed to clear the collars and flanges of the rolls as it does not project over the outer groove $f'$.

When tapering rolls are used to resist end-thrust, it is well known that the opposed seats upon the hub and casing are closer together at the smaller end of the roll, and any longitudinal movement of the hub and casing in relation to one another is prevented by this feature if the tapering roll be held from end movement. In the present construction the beveled flange and the groove in the hub hold the tapering rolls from end movement, and this prevents the casing from moving endwise over the hub. The tapering seats and the beveled rolls are reversely arranged in the opposite ends of the wheel-center, being preferably disposed upon proximate ends of the wheel-hubs, as shown in Fig. 1.

The operation of the two sets of tapering rolls holds the wheel-center from longitudinal movement in respect to the journal without the rubbing against one another of any collars or shoulders upon the journal and wheel-center. All the wear and friction upon such shoulders is thus avoided, and all the friction in the wheel-center is reduced to rolling-friction.

Having thus set forth the nature of the invention what is claimed herein is:

1. A roller-bearing having a hub with cylindrical and tapering roll-seats thereon and a groove at the junction of said seats, cylindrical rolls fitted to the cylindrical seats and provided with means to hold them in a circular path, and tapering rolls fitted to the tapering seat and having each a beveled flange engaging the side of the groove, and a casing having cylindrical and tapering seats opposed to those upon the hub.

2. A roller-bearing having a hub with cylindrical and tapering roll-seats thereon, an inner groove at the junction of said seats and an outer groove at the outer end of the cylindrical seat, cylindrical rolls fitted to the cylindrical seat and having collars fitted loosely to the outer groove, and tapering rolls fitted to the tapering seats and having each a beveled flange at its larger end bearing against the side of the inner groove, and a casing constructed to clear the collars and flanges of the rolls and having cylindrical and tapering seats opposed to those upon the hub.

3. A wheel-center and axle having hubs and casings in its opposite ends, each hub having a cylindrical and tapering seat with a groove at their junction, cylindrical rolls fitted to the cylindrical seats and tapering rolls fitted to the tapering seats each tapering roll having a flange bearing upon the side of the groove, the casings having cylindrical and tapering seats opposed to the seats upon their respective hubs, and the taper of the tapering seats upon the hubs being disposed opposite to one another upon the proximate ends of the hubs.

In testimony whereof I have hereunto set my hand.

CHARLES S. LOCKWOOD.